Dec. 18, 1951     N. TRBOJEVICH     2,578,764
CONSTANT VELOCITY UNIVERSAL JOINT
Filed March 11, 1946
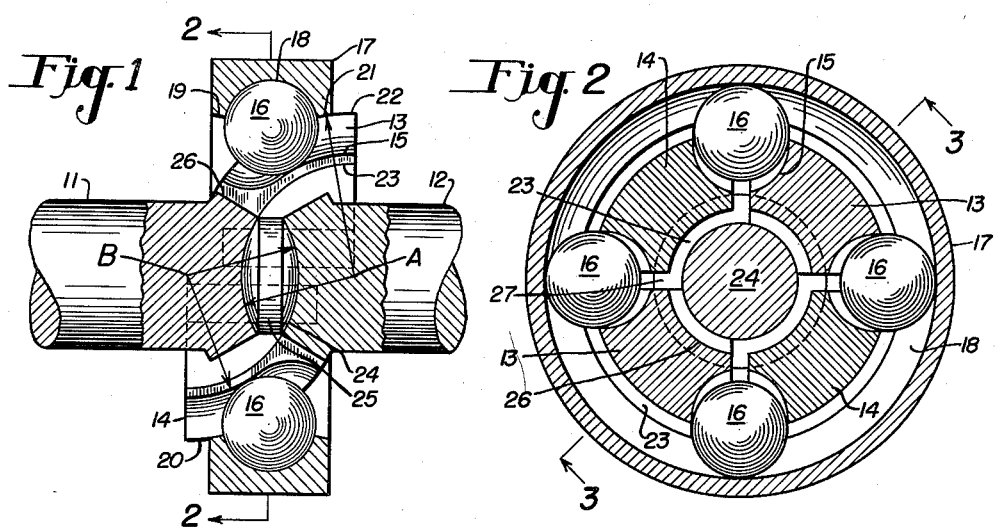
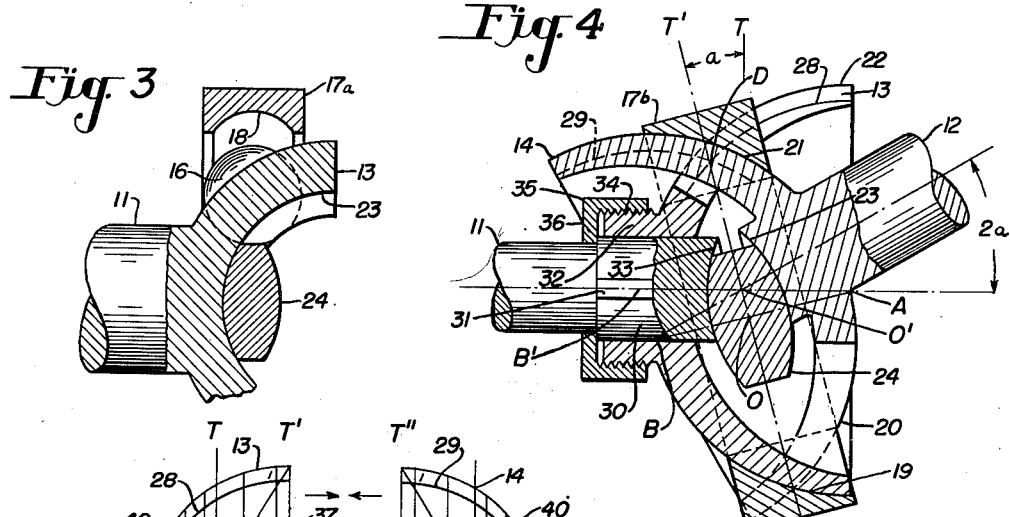
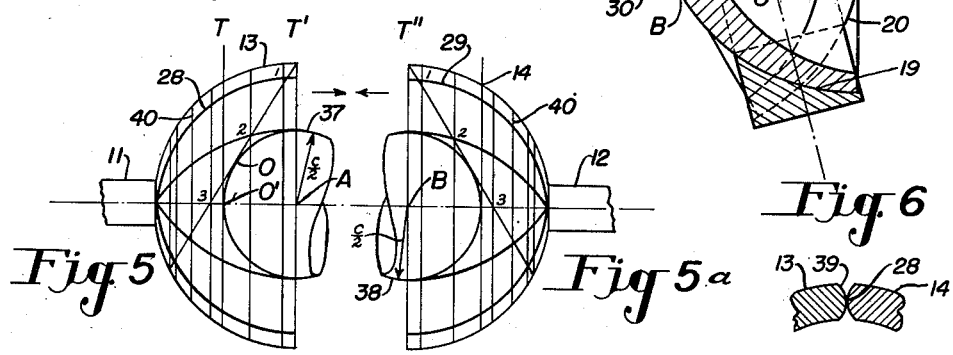
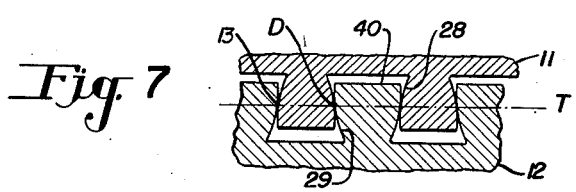
INVENTOR.
Nikola Trbojevich Patented Dec. 18, 1951

2,578,764

UNITED STATES PATENT OFFICE 2,578,764

CONSTANT VELOCITY UNIVERSAL JOINT

Nikola Trbojevich, Cleveland, Ohio

Application March 11, 1946, Serial No. 653,603

2 Claims. (Cl. 64—21)

The invention relates to a universal joint of the constant velocity type.

In particular, the joint operates according to a geometrical principle which I believe I was the first to discover. According to this principle, the joint comprises four cooperating members viz., two spherically formed shafts, an inner bispherical disk member and an outer ring member so arranged that any one of the said four members is capable of simultaneously rotating about two relatively fixed spherical centers, the last said two members being further so constrained as to occupy an angle bisecting plane with respect to the first two members in all angular positions. Other modifications operating upon a similar or analogous principle are described in my two co-pending applications of the same date and respectively entitled "Universal Joints of the Extended Type" and "Universal Joints of the Abridged Type," to which a reference is made.

The terms "extended" and "abridged" were coined by myself in this connection and refer to the relative arrangement of the spherical centers in a bispherical joint of this type. In particular, in the extended type, the spherical shart and the corresponding sphere center are situated at the same side of the angle bisecting plane while in the abridged type the said two elements lie at the opposite sides of the said plane. The structure forming the subject matter of this application is of the abridged type.

The principal object is to construct a joint capable of producing comparatively large angular displacements, of transmitting the angular velocities at a strictly constant ratio from shaft to shaft, of transmitting the required torque by means of a plurality of interposed free rolling balls, i. e. anti-frictionally, and lastly to accomplish the above enumerated tasks in a longitudinally limited and economical space by means of an abridged type of design.

Another object is to construct a joint capable of sustaining considerable longitudinal or axial thrusts both of the tensile and the compressive kind in addition to the transmitted torque.

A further object is to contact each ball by means of three cooperating grooves acting in three different planes, in contradstinction with the customary two-grooves and two-planes arrangement. By this means the balls are accurately centered with respect to the momentary bisecting plane in all angular positions, wherefore relatively high rotational speeds are obtainable by this method.

Another object is to simplify the grinding process used in the manufacture of the curved ball grooves in the shaft projections, which grooves are in this instance accessible from the outside and may be relatively easily ground.

These and other important objects will now be illustrated and described.

In the drawings:

Figure 1 is the principal cross section of the joint taken in the plane I—I of Figure 2 and shown with the two shafts aligned.

Figure 2 is the cross section in the plane 2—2 of Figure 1.

Figure 3 is a detail showing a modified construction of the outer ring, the shaft being the same as shown in the cross section 3—3 of Figure 2.

Figure 4 is a partly diagrammatic elevation of a modified construction employing no balls, also showing a modified construction of the outer ring and the means for adjusting the backlash.

Figures 5 and 5a are geometrical diagrams explanatory of the theory of this mechanism.

Figures 6 and 7 are detail views explanatory of the method of constructing the mating teeth in mechanism shown in Figure 4.

As shown in Figures 1 and 2, the drive shaft 11 and the driven shaft 12 are similar in all details and each possesses integrally formed therewith two outwardly projecting and diametrically opposed spherical lobes or projections 13 and 14 respectively, the said projections being of the form of hollow spherical octants cut from the opposite sides of a hemisphere. The corresponding sphere centers of the shafts 11 and 12 and the projections 13 and 14 are denoted with the letters A and B respectively. At the upper corner of each projection a circular ball groove 15 is formed concentric with the corresponding sphere center and meridionally extending with respect to the corresponding shaft axis. The cross contours of the said cooperating grooves 15 envelop the balls 16 through an arc of 90 degrees or thereabouts on each side thereof, whereby the centers of the said balls will lie in the points of intersection of the cooperating meridians of the spheres A and B in all angular positions.

A circular ring 17 having a hollow circular groove 18 at its inner side contacts the outwardly exposed portions of the balls 16 with a line contact and holds the same in a circle concentric with and perpendicular to the said center distance AB. The said ring 17 may or may not possess in addition a coaxial spherical bearing surface 19 contacting the smoothly finished outer surfaces 20 of the projections 14 and a similar, but oppositely inclined surface 19 contacting the outer surfaces 22 of the cooperating projections 13. The inner portions of the projections 13 and 14 are formed in two accurate and respectively concentric hollow spherical surfaces 23 which contact the relatively movable bispherical disk 24 at both sides thereof. The said disk consists of two opposite convex spherical surfaces respectively concentric with the centers A and B and may comprise also an intervening cylindrical portion 25. The projections 13 and 14 at their roots and next to the corresponding shafts terminate at the cones 26 which form the spaces between any two adjacent projections. The said grooves 15 are further delimited by a plurality of planes parallel to the corresponding axes to form a small gap 27 separating them from the adjacent grooves, see Figure 2.

In Figure 3 the shaft 11 and the projections 13 are shown in the plane section 3—3 of Figure 2. The outer ring 17a is now of a slightly different construction from that shown in Figure 1 in that the spherical V-shaped side bearings 19 and 21, Figure 1, are omitted. The axial thrust tending to separate the two shafts 11 and 12 is borne by the balls 16 contacting the two adjoining meridional grooves 15 and the outer ring 18. The balls 16 are contacted by means of three relatively movable members, in three arcs, disposed in three planes and forming predetermined angles with each other.

A third modification of the outer ring is shown in Figure 4 and is denoted with the numeral 17b. In that modification the oppositely inclined bispherical surfaces 19 and 21 respectively alternate with each other about the ring circumference in such a manner that their radii of curvature are alternately at the points A or B depending upon the number of interlocking projections in the two cooperating shafts whereby all of the said projections are contacted.

As shown in Figure 4, the shaft 12 forms an angle 2a equal to approximately 30 degrees with the shaft 11 while the midplane T' of the ring 17b and of the bispherical member 24 occupy the angle bisecting position as indicated in the drawing. The method of operation will be understood from the following explanation: The left shaft 11 is held firmly and the right shaft 12 is rotated upwardly through an angle 2a in the plane of paper. The spherical center A of the shaft 11 is thus relatively fixed while the center B of the shaft 12 translates through the arc B'B whereby the opposing hollow spherical faces 33 and 23 in the two shafts form a taper relative to each other. This causes the bispherical disk 24 to slide outwardly, its center describing the distance O'O. Inasmuch as the said disk is formed into a bispherical contour corresponding to the centers A and B, it follows that during any such translation it remains concentric with respect to both centers A and B wherefore its midplane T' bisects at right angles the said distance AB. The outer ring 17b performs exactly the same kind of motion in always remaining concentric and coplanar with respect to the said disk 24, i. e. it rotates about the same momentary axis AB as the disk. It is of interest to note that according to this invention, the four cooperating members viz. the two shafts 11 and 12, the disk 24 and the ring 17b are all capable of rotating simultaneously about two relatively fixed centers A and B, the exact nature of their interdependence being such that the last two members always occupy an angle bisecting position with respect to the first two members as previously stated. The function of the said two angle bisecting members 14 and 17b is, therefore, to insure that the distance AB should remain a constant in all angular positions of the two cooperating shafts and the said members are enabled to do so by the virtue of the meridional spacing of the intermeshing projections 13 and 14 as it will be presently explained.

The method of meshing two cooperating projections 13 and 14 respectively, without the intervention of balls is also shown in Figure 4. A point contact at the point D is obtained by contacting two meridians 28 and 29 respectively. As the shafts 11 and 12 are rotated, the said two meridians slide upon each other longitudinally, and at any instant include the same angle relative to each other. Hence, the ring 17b with its two inclined spherical surfaces 19 and 21 fits the outer spherical surfaces 20 and 22 of the projections in all positions and its plane of rotation coincides with the said momentary angle bisecting plane T'.

The method of adjusting the backlash is also shown in Figure 4. The shaft 11 is provided with an enlarged cylindrical portion or plug 30 which engages by means of one or more slidable keys 31 the inner bore of the shank 32, the latter being integral with the projections 13. The end of the said plug 30 is formed into a concave spherical bearing surface 33 concentric with the point A thus conforming with the corresponding convex surface of the bispherical member 24. A screw thread 34 is formed upon the outer circumference of the shank 30 meshing with the adjusting nut 35, the front portion 36 of which abuts the said plug 30. When the nut 35 is tightened it brings the shaft end 33 in contact with the member 24 and the joint may be tightened to any desired extent.

Figures 5 and 5a are geometrical diagrams further illustrating the theory of this joint. The two cooperating hemispheres 13 and 14 have centers at A and B respectively. From the said two centers two smaller base spheres 37 and 38 are constructed each having a radius equal to C/2, in which C denotes the centerdistance AB. Any plane T tangent to either one of these spheres intersects the outer or pitch sphere in a circle of a constant radius but the spacings of the meridians 28 and 29 denoted with the numerals 1, 2, 3, etc. along a plane T' inclined relative to the shaft axis will be unevenly spaced depending upon the angle of inclination of the said plane. The points of intersection 1, 2, 3, etc. are the momentary positions of the meridian intersections and hence of the driving balls. When a plane T'' in Fig. 5a is constructed as a mirror image of the plane T' in Fig. 5 and the two planes are superposed by telescoping the spheres 13 and 14 into each other and intermeshing their corresponding projections, it is readily seen that the two cooperating circles T' and T'' together with their momentary meridian spacings will exactly coincide point for point and form a single plane. The said plane bisects the momentary shaft angle at all times. Thus, I obtain a correct meshing of the cooperating meridional grooves by first equally spacing them upon two similar spheres and second by rotating the said spheres always at a relatively fixed centerdistance and about two spherical centers simultaneously.

The method of forming the intermeshing spherical teeth of this type, such as might be used in a general arrangement shown in Figure 4, is diagrammatically illustrated in Figures 6 and 7. In Figure 6 the flanks of the teeth 13 and 14 are rounded off by means of two conjugate and non-interfering curves 39 in order to contact the meridians 28 and 29 respectively at about the middle portion of the flanks with a point contact. In Figure 7 the cooperating teeth 13 and 14 are bounded by two meridians 28 and 29 at their sides and by a latitude circle 40 at their tops thus obtaining the teeth and the intervening spaces in the form of a plurality of congruent spherical trapeziums extending all about the circumference of a truncated sphere and corresponding to a preselected latitude circle.

The mathematical theory of the above discussed motion was presented to a considerable detail in my first mentioned copending application to which a reference was made in the preamble and certain fundamental equations pertaining to this motion have been deduced and set forth there for the first time in the literature, it is believed.

What I claim as new is:

1. A universal joint comprising two rotatable shaft members, a plurality of intermeshing projections in each shaft, two circular grooves in each projection, one on each side thereof, a spherical bearing concentric with the said grooves in each shaft, a plurality of balls in the said grooves, a relatively movable outer ring member and a similarly movable inner biconvex disk member, in which the arrangement is such that each ball is contacted in three planes by means of two cooperating grooves and the said ring and in which the said inner member contacts the said two bearings in such a manner that the respective centers of the said grooves are at a fixed predetermined distance from each other in all angular positions of the said shafts.

2. A universal joint having two shaft members, a spherical bearing in each shaft, a plurality of intermeshing and spherically formed projections in the said shafts, a plurality of circular grooves concentric with the said bearings in the said projections in each shaft, a plurality of relatively movable and outwardly protruding balls contacting the said cooperating grooves, an outer ring member contacting all of the said balls at the said protruding portions thereof and an inner relatively movable member contacting both said bearings and occupying an angle bisecting position with respect to the said shafts at all angles.

NIKOLA TRBOJEVICH.

REFERENCES CITED

The following references are of record in the file of this patent:

UNITED STATES PATENTS

| Number | Name | Date |
|---|---|---|
| 1,677,311 | Weiss | July 17, 1928 |